United States Patent [19]

Wolf et al.

[11] Patent Number: 5,250,754
[45] Date of Patent: Oct. 5, 1993

[54] CLAMPING DEVICE

[76] Inventors: Thomas Wolf, Rossbrunnenstgr. 10, D-6308 Butzbach; Rainer Klauer, Ferbornstr. 15, D-6333 Braunfels, both of Fed. Rep. of Germany

[21] Appl. No.: 776,769

[22] Filed: Oct. 18, 1991

[30] Foreign Application Priority Data

Oct. 18, 1990 [DE] Fed. Rep. of Germany ... 9014426[U]

[51] Int. Cl.$^5$ .......................... H05K 5/00; H02G 3/04
[52] U.S. Cl. ......................................... 174/50; 174/48
[58] Field of Search ................... 174/48, 50; 361/386, 361/388; 403/409.1, 297; 254/104, 42

[56] References Cited

U.S. PATENT DOCUMENTS

| 4,382,580 | 5/1983 | Hellander | 254/104 |
| 4,889,298 | 12/1989 | Hauff | 174/48 |

FOREIGN PATENT DOCUMENTS

| 8807280 | 9/1988 | Fed. Rep. of Germany . |
| 1049621 | 11/1966 | United Kingdom . |

*Primary Examiner*—Harold Broome
*Attorney, Agent, or Firm*—Wegner, Cantor, Mueller & Player

[57] ABSTRACT

A clamping device is used for clamping a pressure plate which is supported on elastic cable holders inside a frame, which clamping device has two wedges whose respective hypotenuses rest on one another, which wedges can move relative to one another and can be pushed between the parts to be spread, and which clamping device has a piston-cylinder unit for moving the wedges. Overall, the clamping device has two piston-cylinder units, arranged side-by-side and parallel, on a support, with wedges which can be moved onto one another.

5 Claims, 3 Drawing Sheets

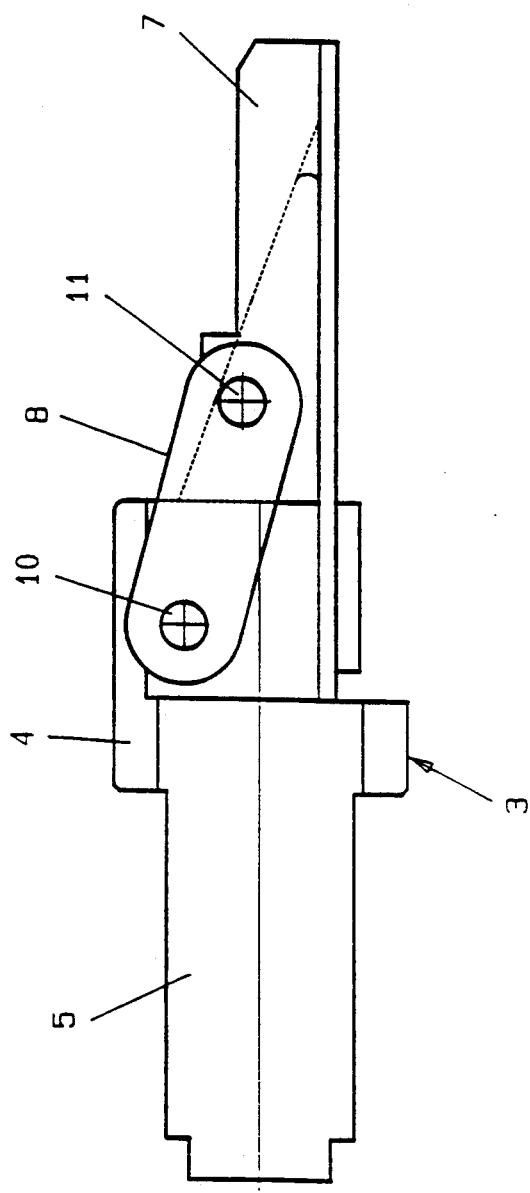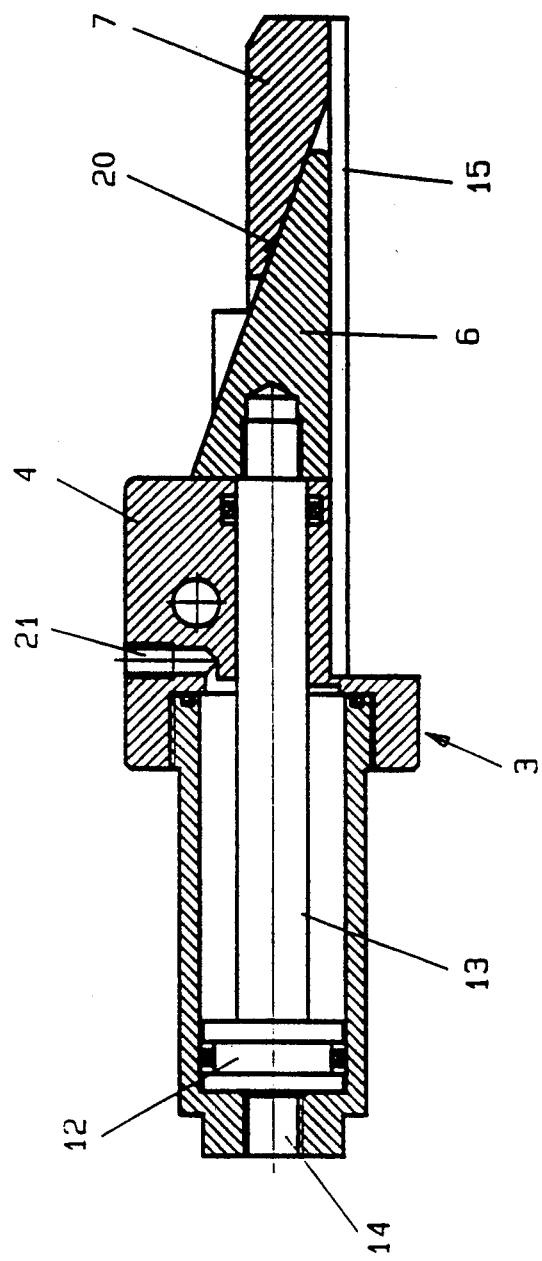

CLAMPING DEVICE

The invention relates to a clamping device for cable duct pressure plate arranged in a frame.

Cable ducts for buildings have, in a frame, a pressure plate which is supported on elastic cable holders and moves in the direction of the cable holders. To seal the cable duct, the pressure plate must be clamped relative to the frame against the cable holders, which is carried out in the case of the known cable ducts by means of a screw which is screwed into the frame and is supported on the pressure plate. The clamping of the pressure plate by means of this screw is laborious, since the screw is difficult to reach inside the frame with a screwdriver.

The invention is based on the object of designing a clamping device of the type mentioned initially with which the clamping of the pressure plate can be carried out as simply and quickly as possible.

This object is achieved according to the invention by the device being provided with two wedges whose respective hypotenuses rest on one another, which wedges can move relative to one another and can be pushed between the parts to be spread, and by an operating unit being provided for moving the wedges.

Such a clamping device is pushed between the pressure plate and the frame of the cable duct and is then operated to achieve the required clamping effect. Since the operating unit is part of the clamping device, there is no longer any need to use a screwdriver in the region of the frame where access is difficult. In addition, when using the clamping device according to the invention, the frame can be of simpler design, since it requires no screws for clamping the pressure plate. When using the clamping device according to the invention, after clamping the pressure plate in the frame, spacer pins are used, for example, before the clamping device is released and removed from the frame.

In the case of the operating unit, it is possible to make use of a spindle which can be rotated manually by means of a screwdriver and which draws the one wedge onto the other. However, it is particularly advantageous if, in accordance with a preferred embodiment of the invention, the operating unit is a piston-cylinder unit. By this means, clamping can be carried out very quickly and, by defining the pressure of the hydraulic fluid, the correct clamping force is necessarily applied.

The piston-cylinder unit can be used in different ways to move the wedges. From the design point of view, it is particularly simple to design the clamping unit if, in accordance with a more preferred embodiment of the invention, one of the wedges is mounted directly on a piston rod of the piston-cylinder unit and can be moved away from the piston-cylinder unit to spread the wedges, and the second wedge, resting on the hypotenuse of the first wedge, is held on the first wedge by means of a strap which is pivotally connected to the second wedge and to the housing of the piston-cylinder unit.

The stability of the clamping device is increased if the first wedge is held such that it moves on a guide tongue mounted on the piston-cylinder unit.

The two wedges, which slide on one another, can be prevented in a very simple manner from sliding out laterally if the second wedge is guided over the side surfaces of the first wedge with two lateral side pieces, and in each case one strap is pivotally connected to each side piece.

It is possible to remove the device from the cable duct, after clamping its pressure plate, without using any great force, if the space on the piston rod side of the piston-cylinder unit is designed such that it can be subjected to pressure for moving the wedges back.

Tilting of the pressure plate during clamping can be prevented by applying force at two different points, in that, in accordance with a further embodiment of the invention, two piston-cylinder units with wedges that can be moved onto one another are provided side-by-side and parallel, on a support. Such an embodiment additionally offers the advantage that the clamping force is applied at the point where the cable holders produce the opposing forces. In this way, the pressure plate is not subjected to bending, or only to little bending, so that the risk of fracture is reduced. In the case of this embodiment, it is furthermore advantageous that the two edge regions of the pressure plate are used for clamping it, since, in the case of a pressure plate whose cross section becomes thicker towards the center, there is more space in the edge regions for pushing in the two wedge arrangements than in the central region.

The invention permits numerous embodiment possibilities. For further clarification of its basic principle, one such embodiment is shown in the drawing and is described in the following text, in which:

FIG. 2 shows a side view of the clamping device;

FIG. 3 shows a longitudinal section through the clamping device along the line III—III in FIG. 1;

Figure 1:
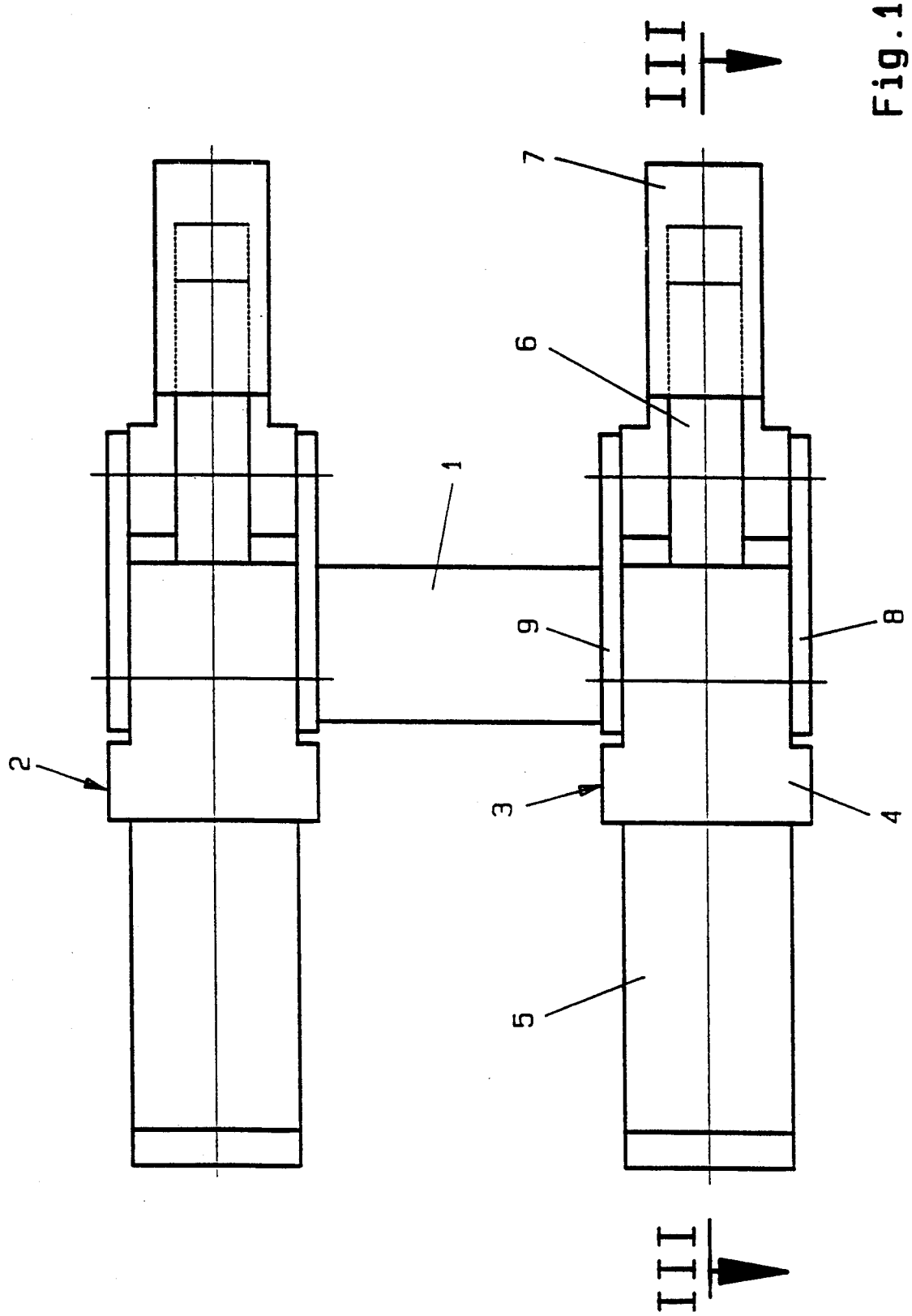
FIG. 1 shows a plan view of the clamping device according to the invention.

FIG. 1 shows a support 1, on which two piston-cylinder units 2, 3 are mounted parallel and side-by-side. Each piston-cylinder unit 2, 3 has a base body 4, in which there is screwed a cylinder 5 which can be subjected to hydraulic pressure. By applying pressure to this cylinder 5, a wedge 6, which tapers with increasing distance from the base body 4, is moved away from the base body 4. On this wedge 6 there rests a second wedge 7 which is pivotally connected to the base body 4 by means of two straps 8, 9.

FIG. 2 clarifies how the wedge 7 is connected to the base body 4. The strap 8 can be seen, which is pivotally mounted at 10 on the base body 4 and at 11 on the wedge 7.

The method of operation of the clamping device is easily understood from FIG. 3. Said figure shows a piston 12 in the cylinder 5, which piston 12 has a piston rod 13 passing through the base body 4. The free end of the piston rod 13 is fixedly connected to the wedge 6. If the cylinder 5 is subjected to pressure from the side facing away from the piston rod 13, via a hydraulic fluid inlet 14, the piston 12 moves to the right, as seen in the drawing, as a result of which the wedge 6 moves away from the base body 4 to the right. Since the wedge 7 is coupled to the base body 4 by means of the straps 8, 9 shown in FIGS. 1 and 2, it cannot move to the right with the wedge 6. It is thus raised from the wedge 6 and, with the straps 8, 9 pivoting, moves upwards in a counter-clockwise manner as a result of which the desired clamping effect is produced.

For guiding the wedge 6, said wedge rests on a guide tongue 15 which projects forward from the base body 4.

When using the clamping device, this guide tongue 15 is supported against one of the surfaces to be spread and the upper side of the wedge 7 is supported against the other one of the surfaces to be spread. In order that the wedges 6, 7 can be moved back again to their original position, after clamping, the piston 12 can be subjected to hydraulic pressure from the side of the piston rod 13, via a hydraulic fluid inlet 21, so that the piston 12 may execute a reverse stroke.

Figure 4:
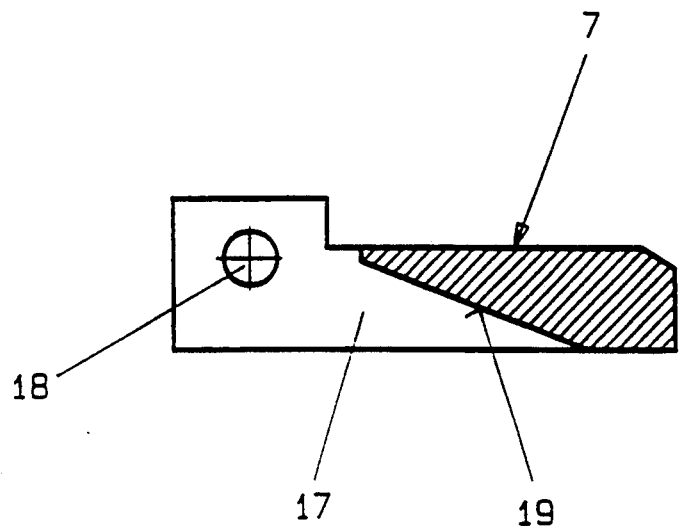
FIG. 4 shows a section through an upper wedge of the clamping device.
Figure 5:
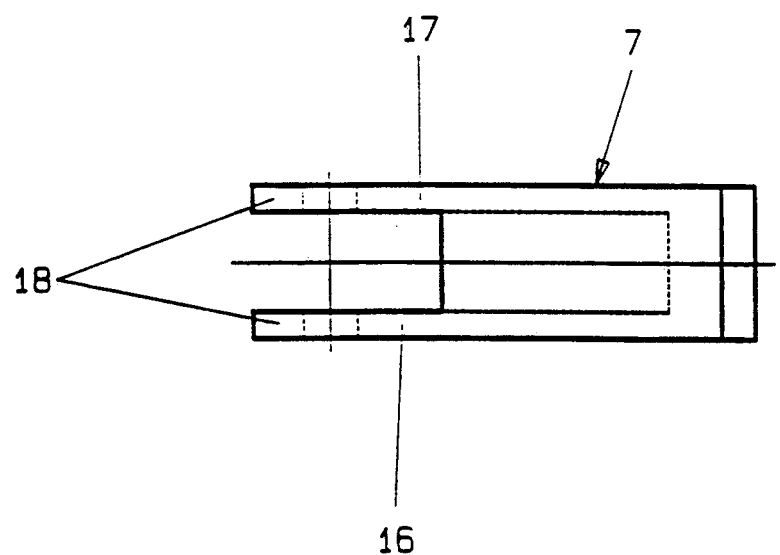
FIG. 5 shows a plan view of the wedge in FIG. 4.

FIGS. 4 and 5 allow the design of the wedge 7 to be discerned in more detail. As FIG. 5 shows, the wedge 7 has two lateral side pieces 16, 17, with which it may grip over the side surfaces of the wedge 6, so that the wedge 7 is held on the wedge 6 and cannot slide away to the side. The two side pieces 16, 17 have a hole 18 in an elevated region which is used for the pivot connection of the straps 8, 9. In FIG. 4, a wedge surface forming a hypotenuse 19 can be discerned, by means of which the wedge 7 rests on a corresponding wedge surface of the wedge 6, forming a hypotenuse 20, positioned as shows in FIG. 3.

What is claimed is:

1. Clamping device for a cable duct pressure plate arranged in a frame comprising two wedges whose respective hypotenuses rest on one another, said wedges being moveable longitudinally relative to one another and adapted to be pushed between the pressure plate and the frame, and a piston-cylinder unit for moving the wedges relative to each other which has a piston rod, wherein the first of said wedges is mounted directly on the piston rod such that said first wedge can be moved away from the piston-cylinder unit to spread the wedges and wherein the second of said wedges, which rests on the hypotenuse of the first wedge, is held onto the first wedge by means of a strap which is pivotally connected to the second wedge and to the piston-cylinder unit.

2. Clamping device according to claim 1, wherein the first wedge is held such that it moves on a guide tongue mounted on the piston-cylinder unit.

3. Clamping device according to claim 1, the space on the piston rod side of the piston-cylinder unit is designed such that it can be subjected to pressure for moving the wedges.

4. Clamping device according to claim 1, comprising two piston-cylinder units, with wedges that can be moved onto one another, mounted side-by-side and parallel, on a support.

5. Clamping device for a cable duct pressure plate arranged in a frame comprising two wedges whose respective hypotenuses rest on one another, said wedges being moveable longitudinally relative to one another and adapted to be pushed between the pressure plate and the frame, and a piston-cylinder unit for moving the wedges relative to each other which has a piston rod, wherein the first of said wedges is mounted directly on the piston rod such that said first wedge can be moved away from the piston-cylinder unit to spread the wedges and wherein the second of said wedges, which rests on the hypotenuse of the first wedge, is held onto the first wedge by means of two straps which are pivotally connected to the second wedge and to the piston-cylinder unit, wherein the second wedge is guided over the surfaces of the firs wedge with two lateral side pieces, and in each one strap is pivotally connected to each side piece.

* * * * *